(12) United States Patent
Helfen et al.

(10) Patent No.: US 10,086,577 B2
(45) Date of Patent: Oct. 2, 2018

(54) METHOD OF MAKING A SELF-SEALING TIRE, AND A TIRE

(71) Applicant: THE GOODYEAR TIRE & RUBBER COMPANY, Akron, OH (US)

(72) Inventors: Thomas Benedikt Helfen, Wincheringen (DE); Jean-Claude Patrice Philippe Griffoin, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 341 days.

(21) Appl. No.: 14/955,295

(22) Filed: Dec. 1, 2015

(65) Prior Publication Data
US 2017/0151740 A1   Jun. 1, 2017

(51) Int. Cl.
  *B60C 5/14*     (2006.01)
  *B29D 30/06*   (2006.01)
  (Continued)

(52) U.S. Cl.
  CPC ........ *B29D 30/0685* (2013.01); *B08B 7/0042* (2013.01); *B29D 30/0005* (2013.01);
  (Continued)

(58) Field of Classification Search
  CPC ....... B60C 5/14; B60C 5/142; B29D 30/0005; B29D 30/0681; B29D 30/0685; B29D 2030/0686
  See application file for complete search history.

(56) References Cited

U.S. PATENT DOCUMENTS 3,981,342 A * 9/1976 Farber .................. B29C 73/025
                                                                152/504
5,478,426 A    12/1995 Wiler et al.
(Continued)

FOREIGN PATENT DOCUMENTS

DE     102012105015 A1   12/2013
DE     202012104243 U1    3/2014
(Continued)

OTHER PUBLICATIONS

Machine translation of DE 102012105015, 2013.*
European Search Report dated Jan. 30, 2017 for Application Serial No. EP16199241.

*Primary Examiner* — Justin R Fischer
(74) *Attorney, Agent, or Firm* — John D. DeLong

(57) ABSTRACT

The present invention is directed to a method of making a self-sealing pneumatic tire, the tire having a tread width and a radially innermost surface having a residue deposited thereon, comprising the steps of: activating a laser to generate laser radiation; directing a pulse of laser radiation to impinge on an area of the innermost surface, the pulse of radiation having a pulse width and a fluence sufficient to remove at least part of the residue in the area to form a cleaned area; repeating the step of directing the pulse of radiation sequentially over the innermost surface to form a sequence of cleaned areas, the sequence of cleaned areas defining a stripe, the stripe following a continuous nonlinear path extending at least one circumference about the inner surface, the stripe having a stripe width W2; applying a bead of sealant in a continuous bead path extending at least one circumference about the inner surface, the bead of sealant at least partially overlaying the stripe. The invention is further directed to as such a self-sealing pneumatic tire.

11 Claims, 4 Drawing Sheets

(51) Int. Cl.
 *B08B 7/00* (2006.01)
 *B29D 30/00* (2006.01)
 *B60C 19/12* (2006.01)

(52) U.S. Cl.
 CPC ........... *B29D 30/0061* (2013.01); *B60C 5/14* (2013.01); *B60C 19/122* (2013.01); *B29D 2030/0686* (2013.01); *B29D 2030/0698* (2013.01)

(56) References Cited

U.S. PATENT DOCUMENTS

| | | |
|---|---|---|
| 6,369,353 B1 | 4/2002 | Soska |
| 6,726,012 B2 | 4/2004 | Bielicki et al. |
| 6,915,826 B2 | 7/2005 | Poling et al. |
| 7,419,557 B2 * | 9/2008 | Majumdar ......... B29D 30/0662 152/152.1 |
| 7,772,521 B2 | 8/2010 | Smith, Jr. et al. |
| 8,442,670 B2 | 5/2013 | Chebli et al. |
| 8,972,035 B2 | 3/2015 | Hair, Jr. et al. |
| 2003/0155058 A1 | 8/2003 | Saito |
| 2005/0274448 A1 | 12/2005 | Lettieri et al. |
| 2010/0243127 A1 | 9/2010 | Chebli et al. |

FOREIGN PATENT DOCUMENTS

| | | |
|---|---|---|
| DE | 102013220066 | 12/2014 |
| EP | 1598121 A2 | 11/2005 |
| EP | 2674287 A1 | 12/2013 |
| EP | 3085523 A1 | 10/2016 |
| WO | 2007101112 A1 | 9/2007 |
| WO | 2017082162 A1 | 5/2017 |

\* cited by examiner

METHOD OF MAKING A SELF-SEALING TIRE, AND A TIRE

BACKGROUND

An innerliner for a pneumatic tire is typically formed from either a compound containing a major proportion by weight of a halobutyl rubber. Before the tire is cured, the entire original inner surface of the innerliner and/or the outer surface of a shaping bladder used in the curing press is coated with a release agent. The release agent is commonly referred to as a "lining cement" when used on the surface of the innerliner; and, to a "bladder lube" or "bladder spray" when used on the shaping bladder. The release agent facilitate removal of the cured tire from the curing mold.

It is often desirable to adhere material to the innerliner surface of a cured tire. For example, polyurethane foam may adhered to the innerliner to provide damping of cavity resonance noise, see for example US 2013/0032262. Electronic devices such as antennae, pressure monitors, or the like may installed, see for example U.S. Pat. No. 7,332,047. Sealant materials may be installed, see for example U.S. Pat. No. 4,359,078. In each case, in order to obtain good adhesion to the innerliner surface, it is sometimes desirable to remove the release agent from the innerliner surface.

Laser cleaning of tire innerliner surfaces has been disclosed, see for example U.S. Publication 2005/0274448. Laser cleaning can be time intensive. It has now been found that selective cleaning of the innerliner surface with a laser in a specific pattern can facilitate good adhesion to the innerliner while greatly reducing the time required to sufficiently clean the surface.

SUMMARY

The present invention is directed to a method of making a self-sealing pneumatic tire, the tire having a tread width and a radially innermost surface having a residue deposited thereon, comprising the steps of: activating a laser to generate laser radiation; directing a pulse of laser radiation to impinge on an area of the innermost surface, the pulse of radiation having a pulse width and a fluence sufficient to remove at least part of the residue in the area to form a cleaned area; repeating the step of directing the pulse of radiation sequentially over the innermost surface to form a sequence of cleaned areas, the sequence of cleaned areas defining a stripe, the stripe following a continuous nonlinear path extending at least one circumference about the inner surface, the stripe having a stripe width W2; applying a bead of sealant in a continuous bead path extending at least one circumference about the inner surface, the bead of sealant at least partially overlaying the stripe. The invention is further directed to as such a self-sealing pneumatic tire.

DESCRIPTION

There is disclosed a method of making a self-sealing pneumatic tire, the tire having a tread width and a radially innermost surface having a residue deposited thereon, comprising the steps of: activating a laser to generate laser radiation; directing a pulse of laser radiation to impinge on an area of the innermost surface, the pulse of radiation having a pulse width and a fluence sufficient to remove at least part of the residue in the area to form a cleaned area; repeating the step of directing the pulse of radiation sequentially over the innermost surface to form a sequence of cleaned areas, the sequence of cleaned areas defining a stripe, the stripe following a continuous nonlinear path extending at least one circumference about the inner surface, the stripe having a stripe width W2; applying a bead of sealant in a continuous bead path extending at least one circumference about the inner surface, the bead of sealant at least partially overlaying the stripe. This is further disclosed as such a self-sealing pneumatic tire.

As used herein, "axial", and "axially" refer to the axis of rotation of a tire, "circumferential" and "circumferentially" refers to circumscription of the tire, and "radial" and "radially" refer to direction perpendicular to the axis of rotation of the tire.

Figure 1:
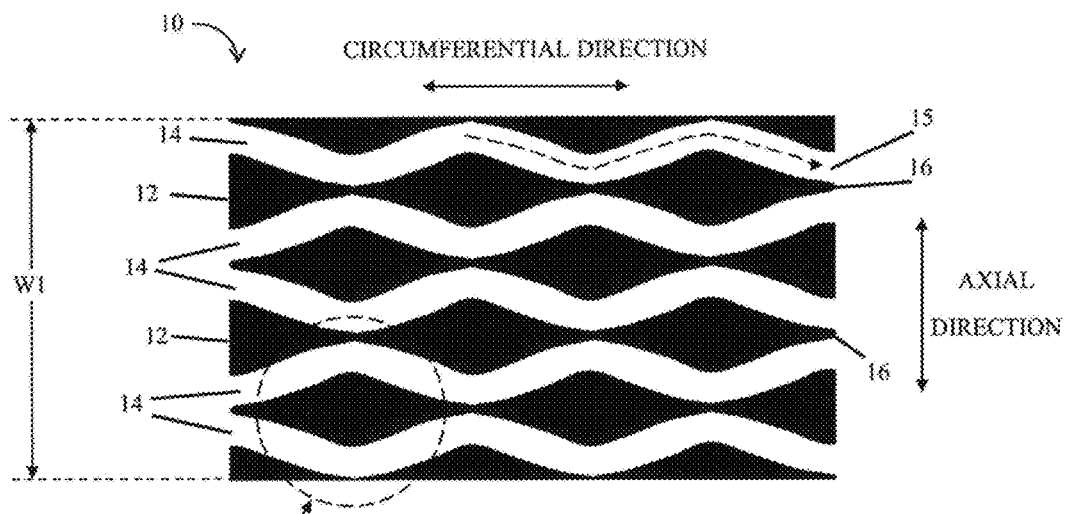
FIG. 1 depicts a laser cleaning pattern on a tire innerliner surface according to the present invention.

With reference now to the drawings, FIG. 1 shows a laser cleaning pattern on a tire innerliner surface (10) according to the present invention. In FIG. 1, regions shown in black represent the innerliner surface (10) covered with residue (12). Such residue may include but is not limited to release agents, dirt, waxes and other rubber compound additives that may have migrated to the innerliner surface. A plurality of nonlinear stripes (14) represent areas of the innerliner surface where residue has been removed by a laser beam from a laser cleaning device (not shown). As indicated, the stripes (14) extend in the circumferentially on surface 10 of the innerliner, and extend circumferentially around the tire innerliner surface (10). As noted, each stripe (14) follows a nonlinear path; in the embodiment of FIG. 1 the stripes are shown following a sinusoidal path (15). Other nonlinear paths may also be used, such as sawtooth and the like. The plurality of stripes (14) are distributed side by side as indicated in the axial direction of the tire innerliner surface (10). In the embodiment shown, the plurality of nonlinear stripes (14) regions are disposed in axial sequence across a predetermined width W1. Adjacent stripes (14) are separated axially by unremoved regions of release agent (12).

Such a predetermined width W1 may correspond to the tread width of the tire, the shoulder-to-shoulder distance of the tire, or the bead-to-bead distance of the tire. The particular width W1 is determined by the subsequent application of the cleaned surface; for example application of a tire sealant may require a width W1 sufficient to seal punctures in the ground contact area of the tire, which may be approximately the tread width or the shoulder to should width, as would be determined by one skilled in the art.

Figure 2:
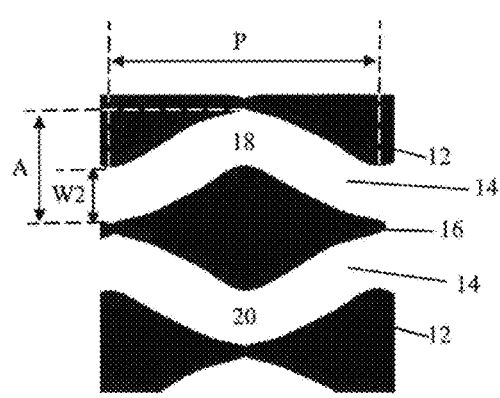
FIG. 2 shows a detail of the pattern of FIG. 1.

FIG. 2 shows a magnified view of the circled region of FIG. 1. As seen in FIG. 2, each stripe (14) has a width (W2). Following the laser motion path (15) the cleaned stripe (14) defines an amplitude (A) and period (P) characteristic of the laser motion path (15). By laser motion path, it is meant that the path (15) is formed by the relative motion of the laser beam (not shown) on the surface (10); such a motion may be imparted by physically moving the laser beam impinging on a stationary surface (10), or physically moving the surface (10) under a stationary laser beam, or a combination of the two. For example, the laser device may be cycled appropriately in the axial direction over the desired amplitude while the surface (10) rotates with the tire in the circumferential direction in a coordinated manner.

Axially adjacent stripes (14) are separated by regions of unremoved residue (12), and the unremoved regions have a minimum separation (16) between axially adjacent stripes (14). Axially adjacent stripes may be offset in the circumferential direction; for example as shown in the embodiment in FIGS. 1 and 2, axially adjacent stripes are offset circumferentially by one half of the period (P), with peak (18) of one stripe (14) aligned circumferentially with trough (20) of the adjacent stripe (14).

As noted above, the method herein generates a cleaning pattern with one or more continuous nonlinear stripes of cleaned surface area extending circumferentially about the innermost surface. By continuous nonlinear stripe, it is meant that the laser radiation impinging on the innerliner surface cleans a continuous path on the innerliner surface completely around the circumference of the tire. Further, the path is nonlinear in the sense that if the innerliner is flattened to a planar conformation, the path may be characterized by a period and an amplitude as the path extend circumferentially about the surface and is thus a continuous circumferential stripe. In one embodiment, the continuous nonlinear path is a sinusoidal path having a period and an amplitude. In other embodiments, the continuous nonlinear circumferential path may follow a sawtooth path, a zig-zag path, or the like.

Cleaning of a tire innerliner innermost surface in the manner described above may be done using a method comprising the steps of: activating a laser to generate laser radiation; directing a pulse of laser radiation to impinge on an area of the innermost surface, the pulse of radiation having a pulse width and a fluence sufficient to remove at least part of the residue in the area to form a cleaned area; repeating the step of directing the pulse of radiation sequentially over the innermost surface to form a sequence of cleaned areas, the sequence of cleaned areas defining a stripe, the stripe following a continuous nonlinear path extending at least one circumference about the inner surface, the stripe having a stripe width W2.

Figure 3:
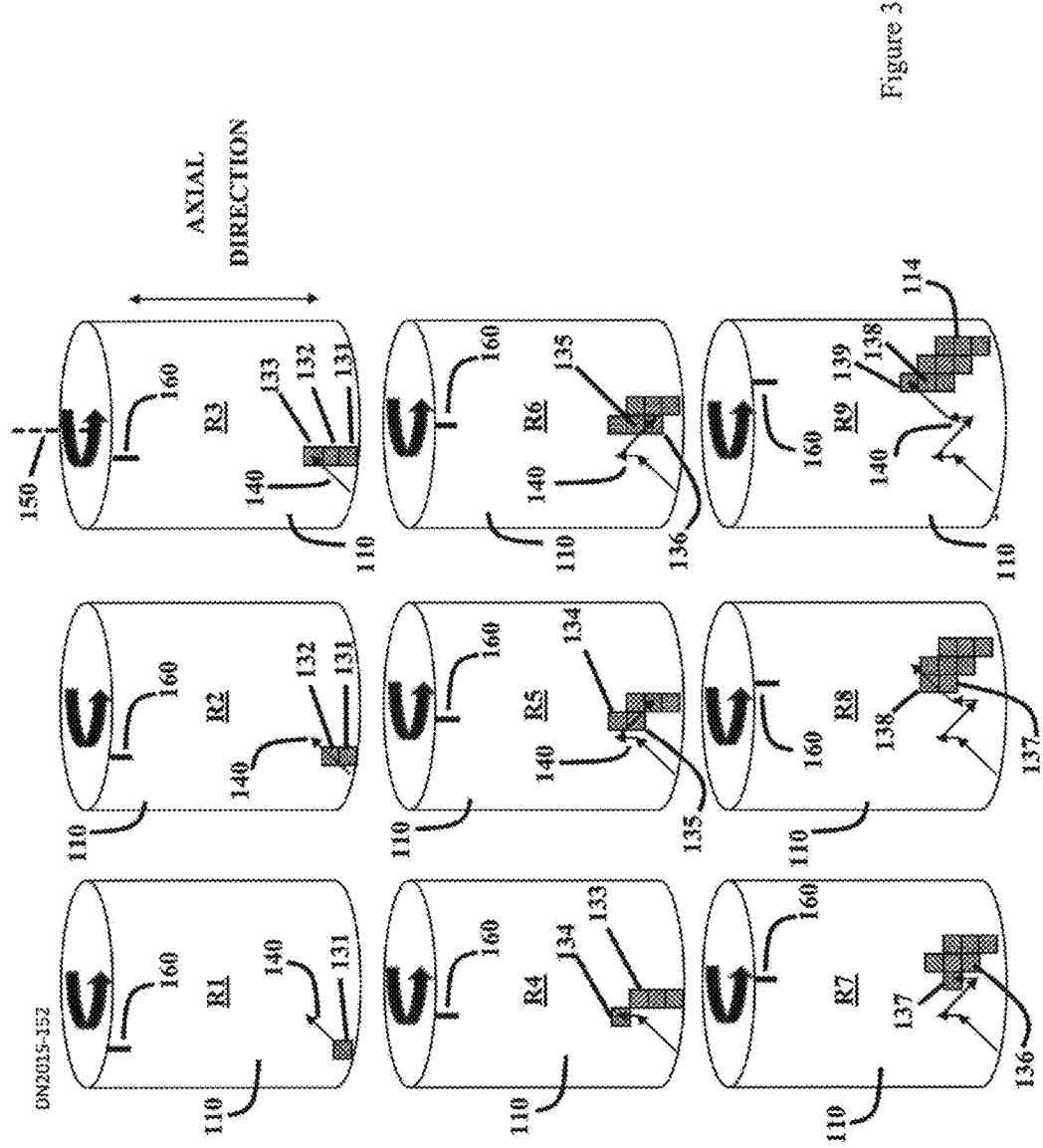
FIG. 3 shows a representation of a sequence of laser cleaning steps on a tire innerliner surface.
Figure 4:
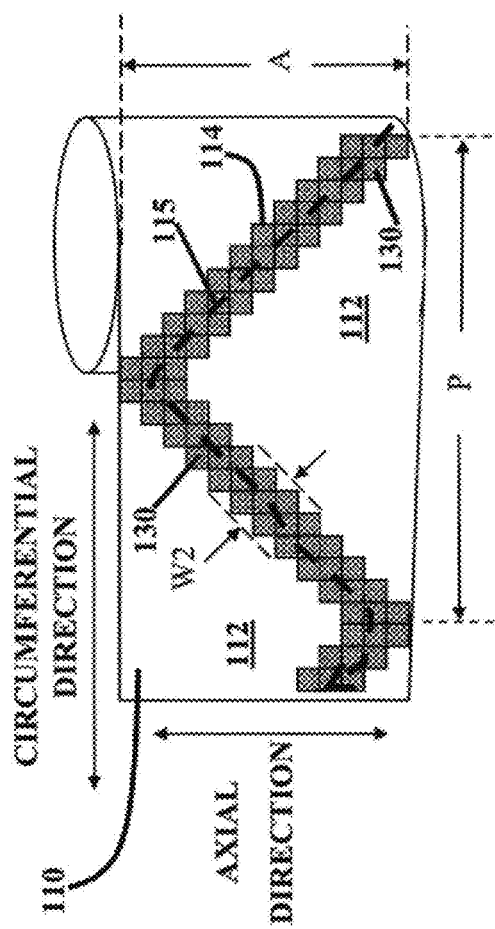
FIG. 4 shows a representation of a cleaned area of a tire innerliner.

FIGS. 3 and 4 illustrate the method for cleaning the innerliner surface, with innermost surface 110 as viewed from a radially outward vantage point.

FIG. 3 shows a series of nine views R1-R9 of innermost surface 110 as it rotates through part of a laser cleaning. In view R1, cleaned area 131 is located at the initial position of the directed laser pulse (not shown) after exposure to the laser beam. Direction arrow 140 indicates the path followed by the laser across surface 110. After one rotational increment in the direction indicated by arrow 150 about the axis 200, view R2 shows cleaned area 132 located incrementally along laser path 140 after exposure to the laser beam. Cleaned area 132 is adjacent cleaned area 131. As is apparent, cleaned areas 131 and 132 are square shaped, having been formed by a laser pulse having a square cross section (not shown). Subsequent views R3 through R9 show the sequential addition of cleaned areas 133-139 as the innersurface 110 incrementally rotates and the laser pulse follows the directional arrow 140, and the gradual definition of the stripe 114.

With reference to FIG. 4, innermost surface 110 is shown as a flattened plane to better illustrate the method, after rotation through a complete period. Stripe 114 includes a sequence of cleaned areas 130 cleaned by the laser. Regions 112 are innermost surface regions covered with residual that have not been cleaned by the laser. Stripe 114 has width W2 and follows nonlinear path 115 (shown as a dashed line) with period P and amplitude A.

The illustrations of FIGS. 3 and 4 are illustrative only. In practice, the number of cleaned areas extend axially across the stripe width will depend on both the stripe width and the pulse width. In one embodiment, the pulse width ranges from 0.25 to 1 mm. For example, for a stripe width of 10 mm and a square laser pulse having a pulse with of 0.625 mm, a total of 16 axially adjacent cleaning areas would be needed. The pulse may have a cross sectional area of various shapes, including but not limited to square, circular, and the like.

Progression of the laser pulse along its path may be done in a manner such that the resulting stripe is a continuous winding, with a gradual axial index. In this embodiment, the stripe will be seen as a continuous helical winding around the circumference of the innersurface. Viewed radially over a limited region, the helical winding would appear as a plurality of stripes as seen in FIG. 1. Alternatively, each individual stripes may begin and end at the same position on the innerliner surface, resulting in a plurality of unconnected stripes, in contrast to a continuous helical winding.

The laser pulse following a particular directional path as in FIG. 3 results in cleaned areas adjacent to other cleaned areas. In this embodiment, each cleaned areas is adjacent to at least one other cleaned area. In another embodiment, the laser pulse may at least partially overlap a previously cleaned area, resulting in a full or partial overlap of cleaned areas. Such overlap may be done in a manner to effectively clean the same areas multiple times, to give a more complete removal of the residue.

Devices for cleaning the innerliner surface of a tire with a laser device are known in the art and these devices may be readily adapted to perform the current method. Known devices are described for example in U.S. Pat. No. 8,442,670; US 2005/0274448; DE202012104243; and EP2674287. Modification of such devices to conform to the teaching of the current disclosure would be possible for one skilled in the art without undue experimentation.

In one embodiment, the residual matter to be removed is a tire release agent. Tire release agents are well known to those skilled in the art, and include silicone release agents, Teflon release agents, and the like.

In the case of a sinusoidal stripe, the period and amplitude are as indicated in the Figures. In various embodiments, the period and amplitude of the sinusoidal stripe are related to the laser beam width used to clean the surface. In one embodiment, the ratio of the amplitude to the laser width ranges from 2.5 to 3.5. In one embodiment, the ratio of period distance to amplitude distance ranges from 1.5 to 2.5.

Generally, more than one pass of the laser over the innerliner surface is used to generate the cleaned innerliner surface. In one embodiment, the step of moving the strip of radiation is repeated sequentially axially across the tread width of the tire to form a plurality of nonlinear circumferential stripes. In one embodiment, the process may be repeated across the tread width of the tire. However, the positioning of each sinusoidal path, for example, may be done so as to offset the undulations of the axially adjacent cleaned paths. In one embodiment, when viewed in the axial direction of the innerliner surface, the peak of a particular stripe may be offset from the peak of an adjacent stripe by one half of the period, thus the peak of one stripe will be positioned at the same circumferential position as the trough of an adjacent stripe.

In one embodiment, a minimum width of uncleaned surface maintained between the adjacent stripes. Thus for example in a sinusoidal pattern where a trough of one stripe and a peak of an axially adjacent stripe are axially aligned in an offset pattern as described above, a minimum distance is maintained. In one embodiment, this minimum axial separation between axially adjacent stripes is 0.5 times the laser width.

Figure 5:
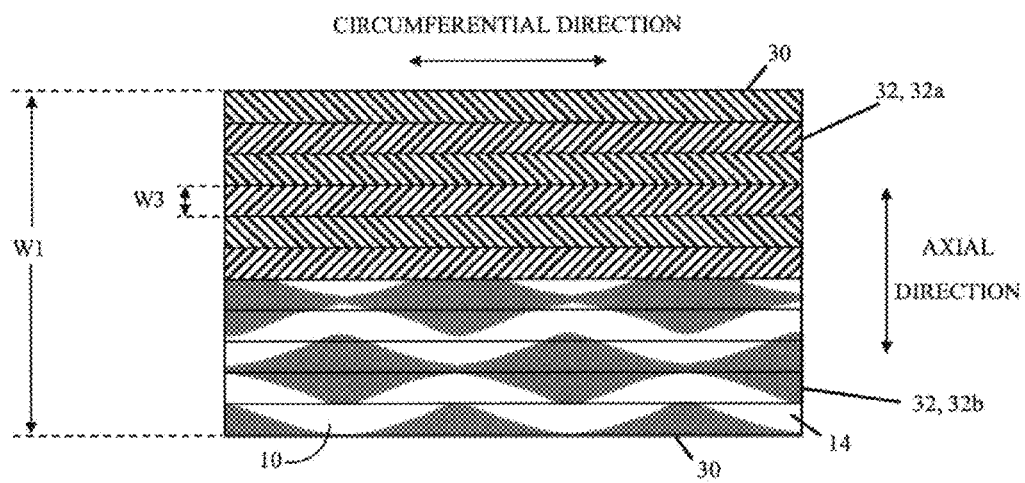
FIG. 5 shows sealant overlaying the cleaned innerliner of FIG. 1.

With reference now to FIG. 5, puncture sealant layer 30 overlays cleaned innerliner surface 10. Sealant layer 30 includes a plurality of axially adjacent sealant beads 32. For purposes of illustration, sealant beads 32 are shown both in shaded view 32a and transparent view 32b to show the position of the sealant beads 32 as disposed over cleaned innerliner surface 10. Sealant beads 32 have a width indicated as W3. In the embodiments seen in FIGS. 1, 2 and 5, the sealant bead width W3 is approximately equal to the width W2 of the laser-cleaned stripes 14. The combination of the sinusoidal path 15 taken by the stripes 14 along with the stripe width W2 and sealant bead width W3 ensures that the applied sealant beads 32 are always contacted to at least some cleaned areas of the innerliner surface 10; that is, the bead 32 at least partially overlays the stripe 14. The contact of the sealant beads 32 to areas of the laser cleaned stripes 14 promotes good adhesion of the sealant layer 30 to the innerliner surface 30.

Cleaning of the tire innerliner surface 10 and subsequent application of the sealant layer 30 is done to a cured tire. When formed on the cured tire, the sealant beads 32 have been formed as a single continuous length of extruded or otherwise dispensed sealant material in the desired cross-sectional shape. The bead 32 is applied in a continuous path extending at least one circumference about the inner surface; it one embodiment, the bead is spirally or helically wound to form the layer 30. The sealant beads 32 are applied axially adjacent to and in contact with the axially previously applied winding of bead 32, either in closest axial proximity or with some overlap of sequentially applied winding of beads 32. Axially sequential windings of beads are "additional beads" in the sense that each winding of the bead 32 circumferentially around the tire produces an additional bead that is positioned axially adjacent to and contacting the bead of the previous winding of sealant bead. As seen in FIG. 5, the bead 32 as circumferentially and spirally wound forms a plurality of essentially circumferentially-parallel, axially-contacting beads 32 disposed on the innerliner surface 10. The process of winding and bead application is continued across the predetermined width W1. Suitable apparatus for mixing, extruding and dispensing material onto a tire innerliner in such a manner is known in the art, for example as disclose in U.S. Pat. No. 7,368,024 and U.S. Pat. No. 8,821,982.

The sealant layer may be comprised of any of various sealant compositions as are known in the art. In one embodiment, the sealant composition may include a variety of components, including at least one of an elastomer, a thermoplastic elastomer, an ionomer, a polybutene, an oil and a tackifying resin. Curatives and fillers may also be included in the sealant as desired.

In one embodiment, the sealant comprises an elastomer and a liquid polymer or oil diluent, and suitable curative. Suitable sealant compositions of this type are disclosed in U.S. Pat. No. 6,303,694 and U.S. Pat. No. 8,821,982, both fully incorporated herein by reference. In particular, a sealant of this type comprises a butyl rubber, a polybutene, and a quinoid curing agent.

In one embodiment, the sealant comprises a thermoplastic elastomer and a liquid polymer or oil diluent. Suitable sealant composition of this type are disclosed in U.S. Pat. Nos. 8,871,852; 8,573,271; 8,602,075; EP 2,125,949; and CN100594225. In particular, a sealant of this type comprises a SEBS (styrene/ethylene-butylene/styrene) thermoplastic elastomer, and a polybutene.

Following mixing of the sealant components and any required reaction and curing, the sealant composition is applied to the innerliner of a cured tire. A suitable process for mixing the sealant and applying to a tire innerliner is as disclosed in U.S. Pat. No. 8,821,982.

The thickness of the circumferential sealant layer 30 can vary depending somewhat upon the degree of sealing ability desired as well as the tire itself, including the tire size and intended tire use. For example, the thickness of the sealant layer may range from about 0.13 cm (0.05 inches) to about 1.9 cm (0.75 inches) depending somewhat upon the tire itself and its intended use. For example, in passenger tires, the sealant layer 30 might, for example, have a thickness in a range of about 0.33 cm (0.125 inches) whereas for truck tires, the sealant layer 30 might, for example, have a thickness in a range of about 0.76 cm (0.3 inches). The post cured tire applied sealant layer 30 is generally situated in the crown region of a tire, and, if desired, may include colorant so that it is of a non-black color that may contrast with the black colored inner liner, tread, or sidewall so that a tire puncture can be noticed.

Generally, in operation as a puncture sealant it is desirable that the radially inner surface of the sealant layer maintain a high level of stickiness, or tack. This stickiness is desirable to ensure that during a tire puncture such as with a nail, the sealant will adhere to the nail as it protrudes through the puncture into the tire. The adhesion of the sealant to the nail then maintains the puncture seal and tire inflation pressure while the nail remains in the tire.

A puncture nail may gradually become loose during operation of the tire, leading to elimination of the nail from the puncture. In such a case, the sealant will flow into the puncture and seal the puncture, maintaining tire inflation pressure.

While present exemplary embodiments of this invention and methods of practicing the same have been illustrated and described, it will be recognized that this invention may be otherwise variously embodied and practiced within the scope of the following claims.

What is claimed is:

1. A method of making a self-sealing pneumatic tire, the tire having a tread width and a radially innermost surface having a residue deposited thereon, comprising the steps of:
   activating a laser to generate laser radiation;
   directing a pulse of laser radiation to impinge on an area of the innermost surface, the pulse of radiation having a pulse width and a fluence sufficient to remove at least part of the residue in the area to form a cleaned area;
   repeating the step of directing the pulse of radiation sequentially over the innermost surface to form a sequence of cleaned areas, the sequence of cleaned areas defining a stripe, the stripe following a continuous nonlinear path extending at least one circumference about the inner surface, the stripe having a stripe width;
   applying a bead of sealant in a continuous bead path extending at least one circumference about the inner surface, the bead of sealant at least partially overlaying the stripe.

2. The method of claim 1, wherein the continuous nonlinear circumferential path comprises a sinusoidal path having a period and an amplitude.

3. The method of claim 2, wherein a ratio of the period to the amplitude ranges from 1.5 to 2.5, and a ratio of the amplitude to the stripe width ranges from 2.5 to 3.5.

4. The method of claim 2, wherein the stripe width ranges from 5 mm to 15 mm.

5. The method of claim 1, wherein each nonlinear circumferential stripe is offset in the circumferential direction from its adjacent nonlinear circumferential stripes by one half period distance.

6. The method of claim 1, wherein a minimum axial separation between axial adjacent stripes is 0.5 times the stripe width.

7. The method of claim 1, wherein the sealant bead extends spirally about the circumference of the tire and axially adjacent windings of the bead together extend axially across a predetermined width.

8. The method of claim 1, wherein the bead has a bead width that is substantially equal to the stripe width.

9. The method of claim 1, wherein each winding of the bead overlaps with at least one axially adjacent winding of the bead.

10. The method of claim 1, wherein each winding of the bead contacts at least one axially adjacent winding of the bead.

11. The method of claim 1, wherein the residue comprises a release agent.

\* \* \* \* \*